(12) United States Patent
Shahriari et al.

(10) Patent No.: US 10,703,645 B2
(45) Date of Patent: Jul. 7, 2020

(54) ATMOSPHERIC WATER GENERATION

(71) Applicants: Behrooz Shahriari, Kermanshah (IR); Ehsan Seyfali, Kermanshah (IR)

(72) Inventors: Behrooz Shahriari, Kermanshah (IR); Ehsan Seyfali, Kermanshah (IR)

( * ) Notice: Subject to any disclaimer, the term of this patent is extended or adjusted under 35 U.S.C. 154(b) by 0 days.

(21) Appl. No.: 16/113,922

(22) Filed: Aug. 27, 2018

(65) Prior Publication Data
US 2018/0362366 A1    Dec. 20, 2018

Related U.S. Application Data

(60) Provisional application No. 62/553,923, filed on Sep. 4, 2017.

(51) Int. Cl.
*C02F 1/14* (2006.01)
*B01D 5/00* (2006.01)

(52) U.S. Cl.
CPC ............ *C02F 1/14* (2013.01); *B01D 5/006* (2013.01); *B01D 5/009* (2013.01); *B01D 5/0072* (2013.01); *C02F 2201/009* (2013.01)

(58) Field of Classification Search
None
See application file for complete search history.

(56) References Cited

U.S. PATENT DOCUMENTS

2008/0314058 A1* 12/2008 Jones .................. B01D 1/0094
62/235.1

* cited by examiner

*Primary Examiner* — Derek N Mueller
(74) *Attorney, Agent, or Firm* — Bajwa IP Law Firm; Haris Zaheer Bajwa

(57) ABSTRACT

Disclosed herein is an atmospheric water generation system. The atmospheric water generation system may include a solar collector including a heat absorbing roof and an interior enclosure adjacent the heat absorbing roof. The heat absorbing roof may include a perforated dark panel that may be configured to allow ambient air into the interior enclosure. The system may further include a central tower extending upward from the solar collector such that heated air in the interior enclosure flows from the interior enclosure through the central tower creating an upward air flow stream in the central tower, a water-absorption unit disposed within the central tower and on a path of the air flow stream, in which the air flow stream may contact a water-absorbent liquid stream thereby generating a hydrated solution stream and a moisture-free air stream, and a membrane separation unit comprising a water-selective membrane that may receive the hydrated solution stream and generate a permeate stream including water and a retentate stream including water-absorbent liquid.

16 Claims, 10 Drawing Sheets

ATMOSPHERIC WATER GENERATION

CROSS-REFERENCE TO RELATED APPLICATION

This application claims the benefit of priority from U.S. Provisional Patent Application Ser. No. 62/553,923, filed on Sep. 4, 2017, and entitled "ATMOSPHERIC WATER GENERATION," which is incorporated herein by reference in its entirety.

TECHNICAL FIELD

The present disclosure generally relates to water generation systems, and particularly to an atmospheric water generation system utilizing renewable energy.

BACKGROUND

Water shortage is a significant issue due to pollution of surface water and groundwater resources on one hand and global warming and population increases on the other hand. Drinking water shortage has caused major concerns especially in regions with hot climates. There are two possible approaches to address this issue, one approach is to control water usage and the other approach is to develop new methods and techniques to produce more drinking water.

Most available drinking water generation techniques, particularly those techniques that are based on reverse-osmosis technology, require a significant amount of electrical energy to power water desalination equipment. Industrial water generation plants that generate drinking water by desalinating sea water have negative effects on environment including destructive effects of their waste water discharges on marine environment and groundwater resources. Furthermore, these industrial water generation plants cannot be utilized inland, where no sea water or brackish water is available.

Air humidity on the other hand is a considerable source of water. Recovery of water vapor from air has been attempted utilizing various approaches including by cooling, compressing, adsorption on solid or liquid adsorbents. All the aforementioned methods are energy intensive processes that require a large amount of electrical energy to power the equipment required for cooling or compressing the air in order to extract water from the ambient air.

There is therefore a need for developing water generation plants that may utilize cheaper energy sources in combination with less energy intensive water generation techniques such as absorbing air moisture by a water-absorbent compound to address the serious issue of water shortage.

SUMMARY

According to one or more embodiments, the present disclosure is directed to an atmospheric water generation system. The atmospheric water generation system may include a solar collector including a heat absorbing roof and an interior enclosure adjacent the heat absorbing roof. The heat absorbing roof may include a perforated dark panel that may be configured to allow ambient air into the interior enclosure. The atmospheric water generation system may further include a central tower extending upward from the solar collector, where the central tower may include an upper air outlet opening into atmosphere and a lower air inlet opening to the interior enclosure such that heated air in the interior enclosure may flow from the interior enclosure through the central tower creating an upward air flow stream in the central tower, a water-absorption unit that may be disposed within the central tower and on a path of the air flow stream, where the water-absorption unit may absorb moisture content of the air flow stream by contacting the air flow stream with a water-absorbent liquid stream thereby generating a hydrated solution stream and a moisture-free air stream, and a membrane separation unit that may include a water-selective membrane. The hydrated solution stream may be fed to the membrane separation unit and the membrane separation unit may generate a permeate stream including water and a retentate stream including water-absorbent liquid.

According to an exemplary embodiment, the atmospheric water generation system may further include a wind-catching mechanism that may be configured to catch and guide winds into the water-absorption unit. The wind-catching mechanism may include an elevated tower with a number of lateral air inlets on an upper periphery of the elevated tower in fluid communication with the interior enclosure.

According to an exemplary embodiment, the wind-catching mechanism may further include an air duct buried under ground, where the air duct may connect the lateral air inlets to the interior enclosure. According to an exemplary embodiment, the air duct may connect the lateral air inlets to the interior enclosure via a converging nozzle.

According to an exemplary embodiment, the atmospheric water generation system may further include a vacuum ejector that may be disposed within the central tower above the lower inlet. The vacuum ejector may include an inlet nozzle, a converging diverging nozzle that may be positioned downstream from the inlet nozzle, and a suction port that may open into the vacuum ejector downstream from the inlet nozzle and upstream from the converging diverging. The vacuum ejector may be configured to create suction in the suction port responsive to the ambient air flowing through the vacuum ejector.

According to an exemplary embodiment, the membrane separation unit may include a main enclosure, and a water-selective membrane disposed within the main enclosure. The water-selective membrane may define an interior chamber and an exterior chamber within the main enclosure, and the hydrated solution stream may be fed to the interior chamber, while the exterior chamber may be connected to the suction port.

According to an exemplary embodiment, the atmospheric water generation system may further include a heating mechanism that may be configured to preheat the hydrated solution stream. The heating mechanism may include a series of interconnected pipes that may be disposed within the interior enclosure adjacent the heat absorbing roof. The interconnected pipes may be in fluid communication with the water-absorption unit receiving the hydrated solution stream, and further in fluid communication with the membrane separation unit feeding the preheated hydrated solution stream to the membrane separation unit.

According to an exemplary embodiment, the atmospheric water generation system may further include a condenser that may be configured to condense the permeate stream by contacting the permeate stream with a cooling fluid flowing in a first cooling cycle. The first cooling cycle may include a first cooling coil that may be buried in soil at a first predetermined depth. In an exemplary embodiment, the predetermined depth may be at least 10 m.

According to an exemplary embodiment, the atmospheric water generation system may further include a cooling mechanism configured to cool the retentate stream by contacting the retentate stream with a cooling fluid flowing in a second cooling cycle. The second cooling cycle may include a second cooling coil buried in soil at a second predetermined depth.

According to an exemplary embodiment, the heat absorbing roof further comprises a transparent panel attached to the perforated dark panel. According to an exemplary embodiment, the atmospheric water generation system may further include a heating mechanism that may be configured to preheat the hydrated solution stream. The heating mechanism may include an inclined perforated dark panel that may be disposed within the interior enclosure below the transparent panel, and a series of interconnected pipes that may be disposed within the interior enclosure under the inclined perforated dark panel. The interconnected pipes may be in fluid communication with the water-absorption unit thereby receiving the hydrated solution stream, and the interconnected pipes may further be in fluid communication with the membrane separation unit configured to feed the preheated hydrated solution stream to the membrane separation unit.

According to an exemplary embodiment, the water-absorption unit may include a packed bed absorber including a bed of a packing material. The water-absorbent liquid stream may be sprayed over the packing material and the air flow stream may flow upwardly through the packing material.

According to an exemplary embodiment, the membrane separation unit may include a main enclosure, and a water-selective membrane disposed within the main enclosure. The water-selective membrane may define an interior chamber and an exterior chamber within the main enclosure, and the hydrated solution stream may be fed to the interior chamber, while the exterior chamber may be connected to a vacuum source.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
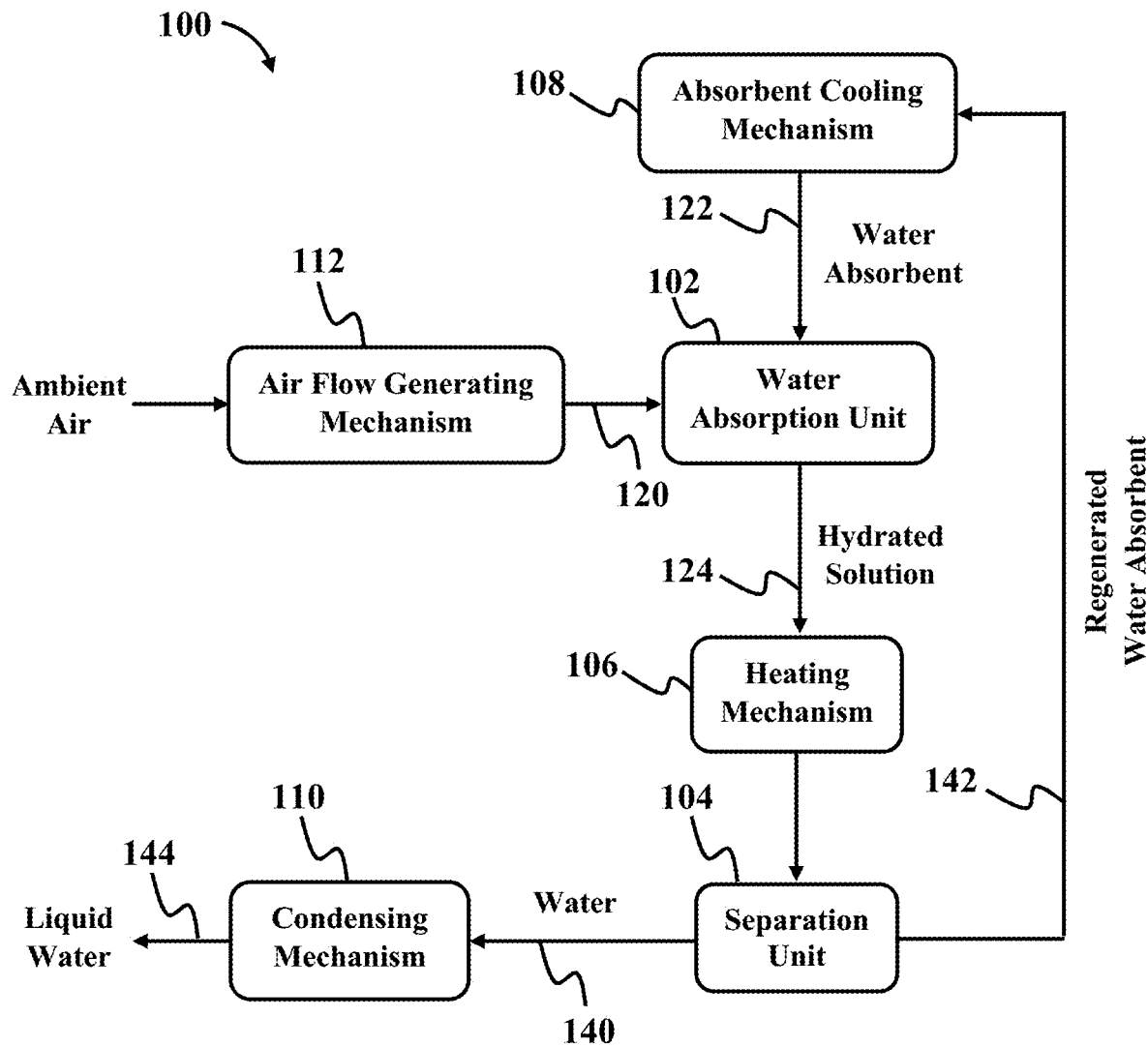
FIG. 1 illustrates a block diagram of an atmospheric water generating system, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Different modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The present disclosure is directed to an exemplary water generation system that generates water by separating moisture from air. Air moisture is absorbed from ambient air by contacting an ambient air stream with a water-absorbent liquid. The moisture in the ambient air stream may be absorbed into the water-absorbent liquid and then the absorbed water may be separated from the water-absorbent liquid and may further be condensed to generate drinking water. Renewable energy sources may be utilized in exemplary embodiments of the present disclosure to generate the ambient air stream and power the equipment required for contacting the generated air stream with the water-absorbent liquid, separating the absorbed moisture from the absorbent liquid, and condensing the separated moisture.

Ambient air stream may be generated by an exemplary air flow generating mechanism that may include at least one of a solar chimney and a wind-catching mechanism. Exemplary air flow generating mechanism of the present disclosure may further be used for generating electricity form air flow utilizing air turbines in the path of the generated air flow. The electricity generated from the air flow may be utilized in pumps and other moving equipment utilized in embodiments of the present disclosure. In exemplary embodiments, such a configuration allows for using renewable energy sources instead of fossil fuels and nuclear energy to address negative environmental impacts of conventional water generating systems and their high energy demand.

FIG. 1 illustrates a block diagram of an atmospheric water generating system 100, consistent with one or more exemplary embodiments of the present disclosure. Water generating system 100 may include a water-absorption unit 102 that may separate moisture from ambient air by contacting an ambient air stream 120 and a water-absorbent liquid stream 122 such that the moisture in the ambient air stream 120 may be absorbed into water-absorbent liquid stream 122 and generate a hydrated solution stream 124. Hydrated solution stream 124 may include the water absorbent liquid and the moisture absorbed from the ambient air stream 120. Water generating system 100 may further include a separation unit 104 that may receive hydrated solution stream 124 from water-absorption unit 102 and separate the moisture from hydrated solution stream 124 thereby generating a water stream 140 and a regenerated water-absorbent stream 142. Regenerated water-absorbent stream 142 may be fed back to water-absorption unit 102 to provide water-absorbent liquid stream 122. In an exemplary embodiment, water generating system 100 may further include a condensing mechanism 110 that may further reduce the temperature of water stream 140 to generate a liquid water stream 144 as a final product.

Referring to FIG. 1, water generating system 100 may further include a heating mechanism 106 that may pre-heat hydrated solution stream 124 before it is fed to separation unit 104. Pre-heating hydrated solution stream 124 may increase the moisture separation efficiency of separation unit 104. According to an exemplary embodiment, water generating system 100 may further include an absorbent cooling mechanism 108 that may reduce the temperature of regenerated water-absorbent stream 142 before it is fed to water-absorption unit 102. Cooling regenerated water-absorbent stream 142 may increase the water absorption efficiency of water-absorption unit 102.

Referring to FIG. 1, according to one or more exemplary embodiments, water generating system 100 may include an air flow generating mechanism 112 that may either suck the ambient air into or catch and guide wind through water-absorption unit 102 to provide ambient air stream 120. According to an exemplary embodiment, air flow generating mechanism 112 may include at least one of a solar chimney and a wind catching mechanism, which will be described in further detail later in the present disclosure.

Figure 2A:
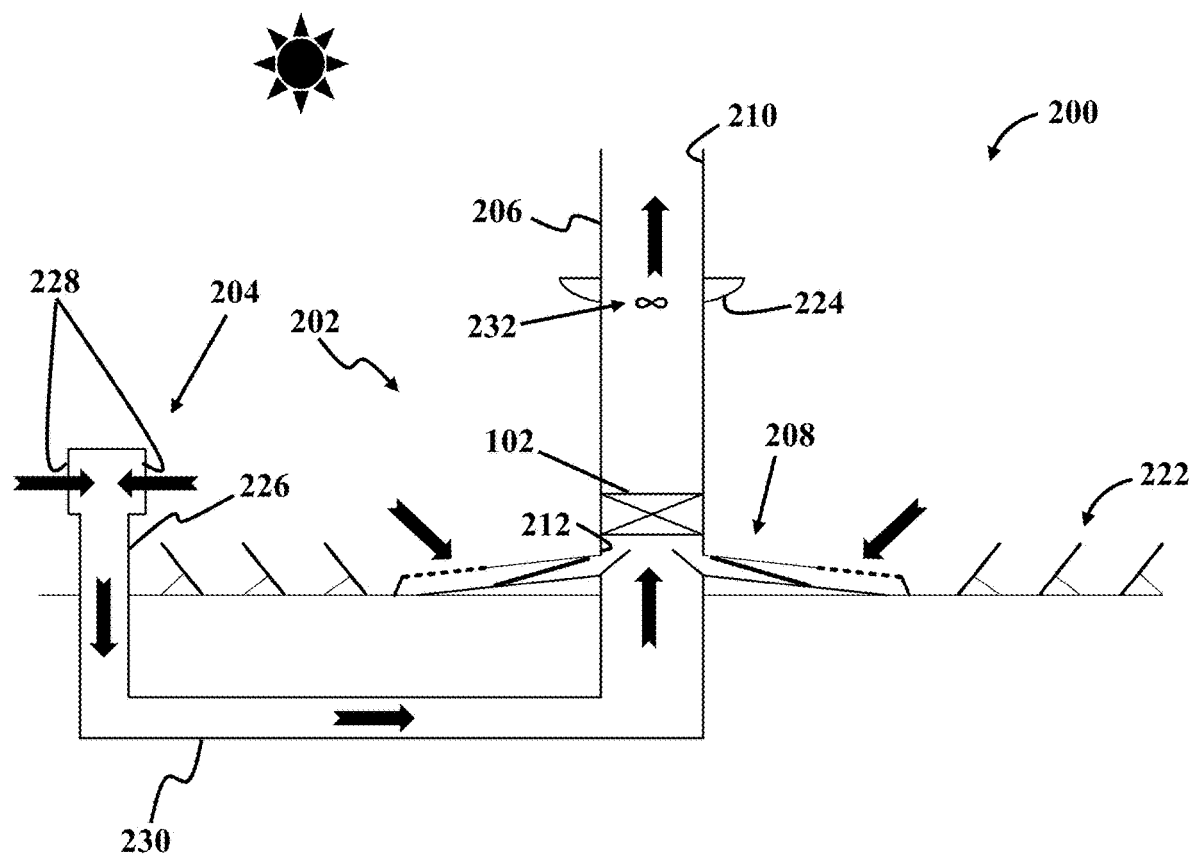
FIG. 2A illustrates a sectional side-view of an air flow generating mechanism, consistent with one or more exemplary embodiments of the present disclosure.

FIG. 2A illustrates a sectional side-view of an air flow generating mechanism 200, consistent with one or more exemplary embodiments of the present disclosure. In an exemplary embodiment, air flow generating mechanism 200 may be similar to air flow generating mechanism 112 of FIG. 1. Referring to FIG. 2A, consistent with one or more exemplary embodiments, air flow generating mechanism 200 may include at least one of a solar chimney 202 and a wind-catching mechanism 204. According to an exemplary embodiment, water absorption unit 102 may be disposed within the lower region of central tower 206 and on a path of the updraft created in central tower 206, this way air flow stream may be provided in water absorption unit 102 and moisture in air flow stream may be absorbed by water absorption unit 102 as was described in connection with FIG. 1.

Figure 2B:
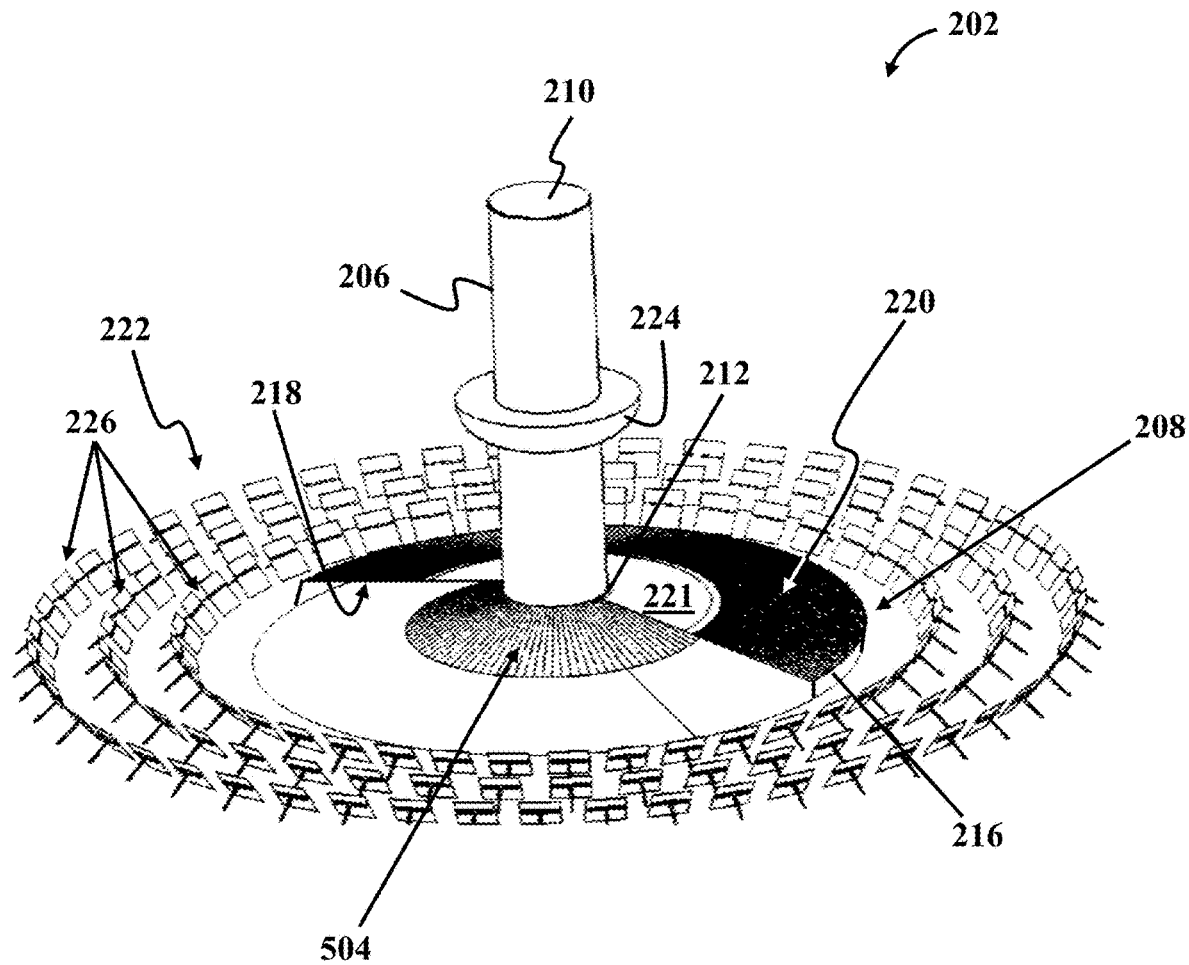
FIG. 2B illustrates a sectional perspective view of a solar chimney, consistent with one or more exemplary embodiments of the present disclosure.

FIG. 2B illustrates a sectional perspective view of a solar chimney 202, consistent with one or more exemplary embodiments of the present disclosure. Referring to FIGS. 2A and 2B, consistent with an exemplary embodiment, solar chimney 202 may include a central tower 206 that may be surrounded by a solar collector 208 that employs radiant solar energy for heating purposes, including but not limited to heating ambient air. Central tower 206 may include an upper air outlet 210 and a lower air inlet 212 and solar collector 208 may open into lower air inlet 212 of central tower 206. Upper air outlet 210 may be at a predetermined height relative to lower air inlet 212 such that a temperature difference created between the ambient air heated in solar collector 208 at a lower region of central tower 206 and ambient air at the top of central tower 206 may create an updraft within central tower 206.

Figure 2C:
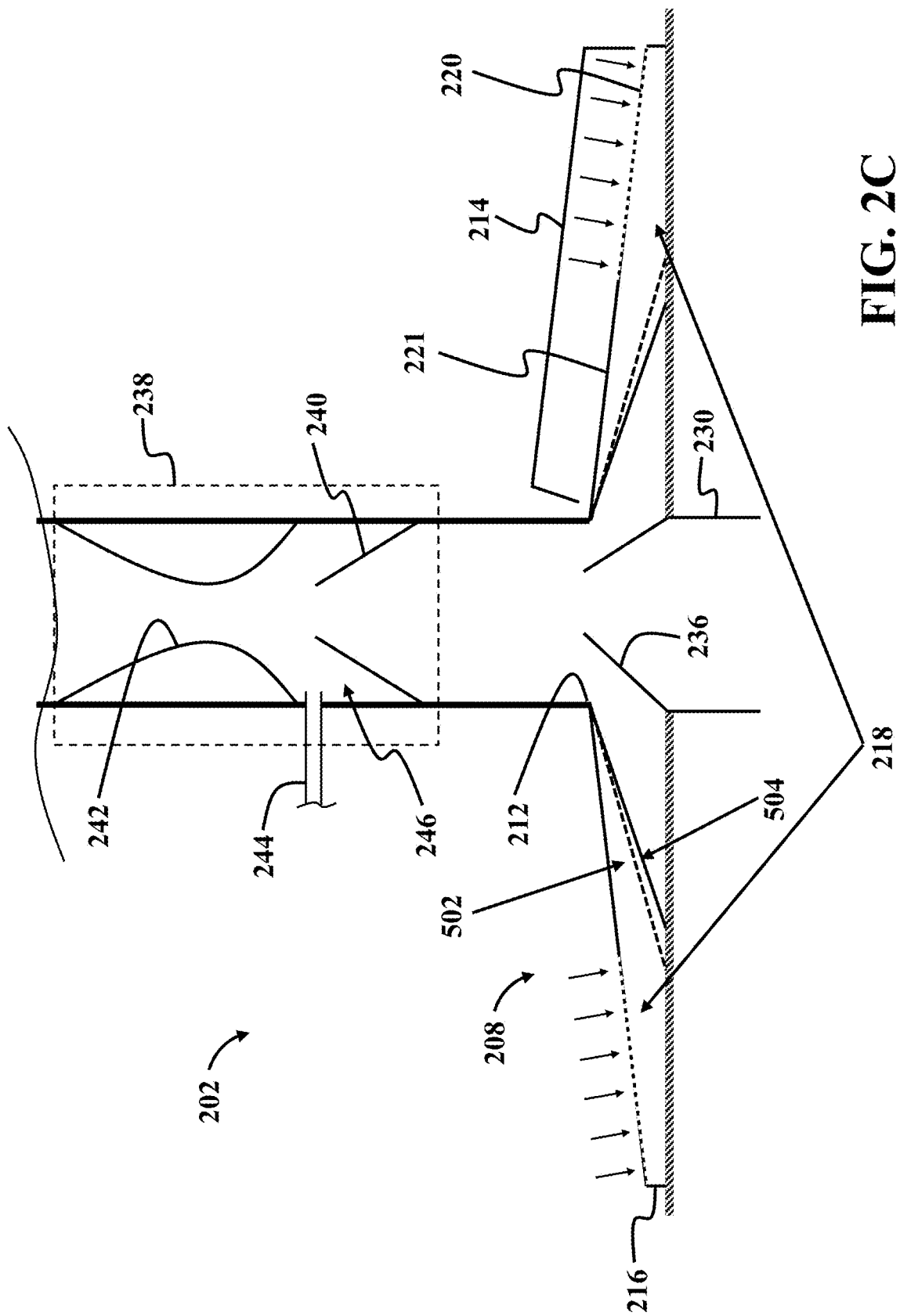
FIG. 2C illustrates a sectional side-view of a solar chimney, consistent with one or more exemplary embodiments of the present disclosure.
Figure 2D:
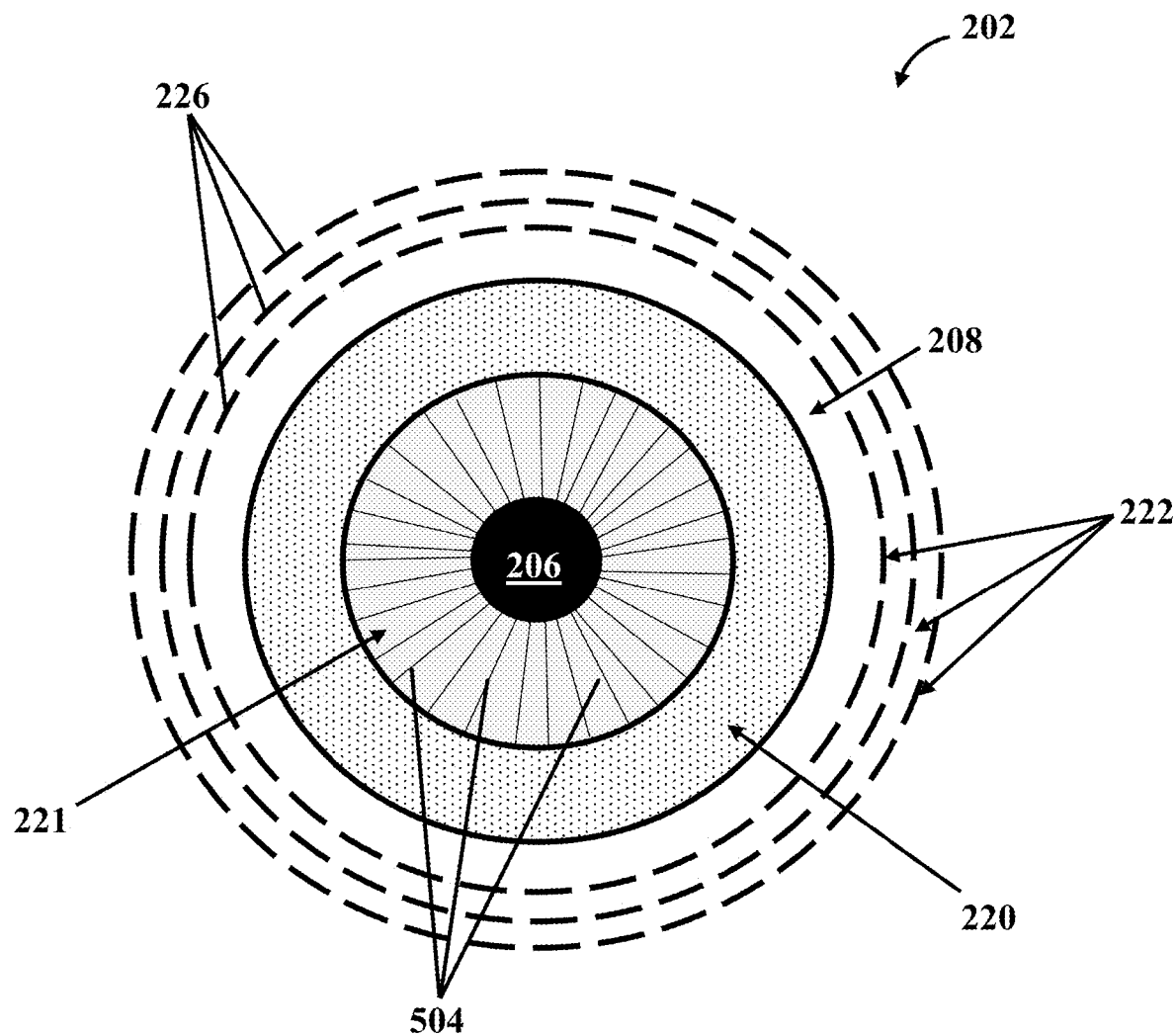
FIG. 2D illustrates a top view of a solar chimney, consistent with one or more exemplary embodiments of the present disclosure.

FIG. 2C illustrates a sectional side-view of solar chimney 202, consistent with one or more exemplary embodiments of the present disclosure. FIG. 2D illustrates a top view of solar chimney 202, consistent with one or more exemplary embodiments of the present disclosure. Referring to FIGS. 2B-2D, consistent with one or more exemplary embodiments, solar collector 208 may be annularly surrounding central tower 206 and may include a heat absorbing roof 214 and a side wall 216 that may define an interior enclosure 218 bellow heat absorbing roof 214. In an exemplary embodiment, heat absorbing roof 214 may include a first perforated annular dark panel 220 that may be attached to an annular transparent panel 221. Ambient air may enter interior enclosure 218 via perforations that may be distributed over an entire surface of first perforated annular dark panel 220 and be heated by sunlight as it passes through the perforations into interior enclosure 218. Due to a temperature difference created between the air heated by sun in interior enclosure 218 and ambient air at the top of central tower 206, the updraft created in central tower 206 constantly draws ambient air into solar chimney 202 via perforations of first perforated annular dark panel 220.

With further reference to FIGS. 2A, 2B and 2D, consistent with one or more embodiments, solar chimney 202 may optionally further include a number of two-axis heliostat mirrors 222 annularly arranged around central tower 206. Heliostat mirrors 222 may reflect the sun light onto a convex mirror 224 mounted on an upper outer periphery of central tower 206 and convex mirror 224 may, in turn, reflect the sun light back onto solar collector 208 in order to increase the energy absorbance efficiency of solar collector 208 by reflecting concentrated solar rays onto heat absorbing roof 216. Referring to FIGS. 2B and 2D, in an exemplary embodiment, heliostat mirrors 222 may be arranged in several concentric circles 226 around central tower 206 such that the sun light reflected from heliostat mirrors 222 may be reflected onto convex mirror 224.

Figure 2E:
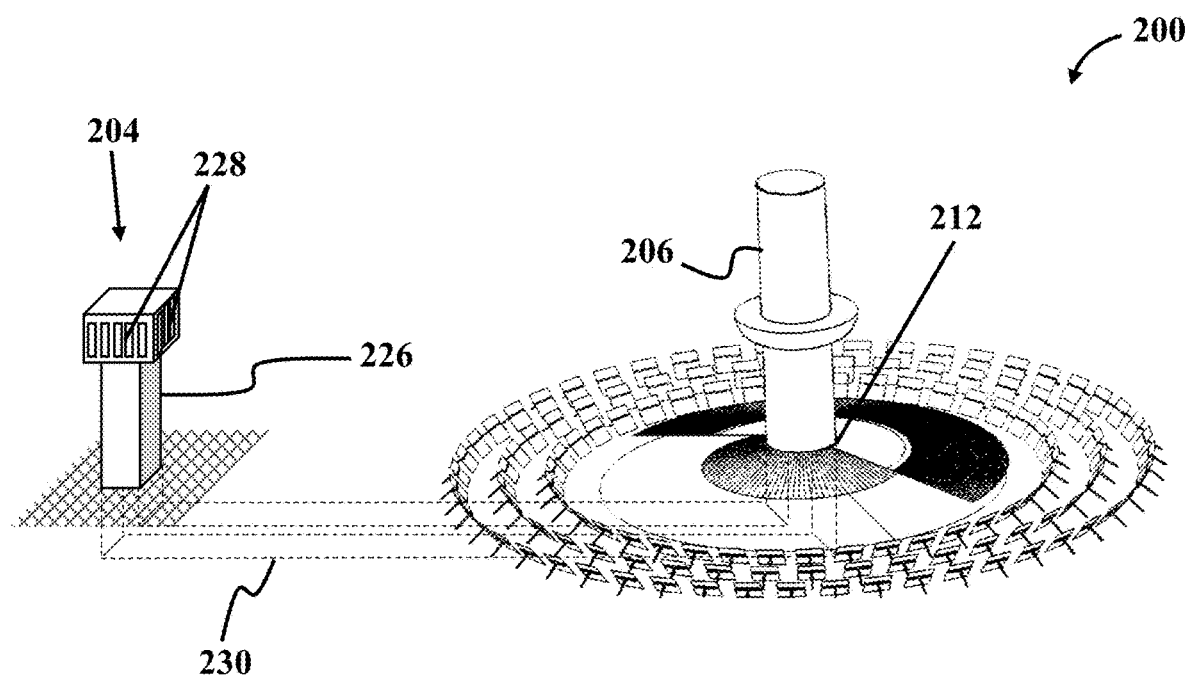
FIG. 2E illustrates a perspective view of an air flow generating mechanism, consistent with one or more exemplary embodiments of the present disclosure.

FIG. 2E illustrates a perspective view of air flow generating mechanism 200, consistent with one or more exemplary embodiments of the present disclosure. Referring to FIGS. 2A and 2E, according to one or more exemplary embodiments, air flow generating mechanism 200 may further include wind-catching mechanism 204 that may catch and guide wind into water absorption unit 102. In an exemplary embodiment, wind-catching mechanism 204 may be an elevated tower 226 that may include a number of lateral air inlets 228 on an upper periphery of elevated tower 226. Air inlets 228 may allow winds to enter wind-catching mechanism 204 and an air duct 230 in fluid communication with air inlets 228 may receive the air and guide it toward lower inlet 212 of central tower 206. Air flow in air duct 230 is created by natural power of winds that are caught in wind-catching mechanism 204. Referring to FIGS. 2A and 2C, in an exemplary embodiment, air duct 230 may open into interior enclosure 218 and ambient air from air duct 230 may flow into lower inlet 212 of central tower 206 via a converging nozzle 236 that may be attached to air duct 230. According to an exemplary embodiment, both solar chimney 202 and wind-catching mechanism 204 may be utilized simultaneously for providing air flow stream inside water absorption unit 102. According to an exemplary embodiment, in the absence of sunlight, air stream inside water absorption unit 102 may be provided by wind-catching mechanism 204 and in the absence of winds during daylight, solar chimney 202 may provide air stream inside water absorption unit 102. In an exemplary embodiment, air duct 230 may be buried underground and ambient air may be cooled as it passes through air duct 230.

Referring to FIGS. 2A and 2E, consistent with one or more exemplary embodiments, utilizing air flow generating mechanism 200 that may include at least one of solar chimney 202 and wind-catching mechanism 204 allows for providing the required air stream for water absorption unit 102 without using fossil fuels and only utilizing renewable energies such as solar and wind energies. Furthermore, a wind turbine 232 may be installed inside central tower 206 to produce electricity form the updraft created in central tower 206. This generated electricity may then be utilized for powering pumps and other moving mechanisms which will be described later in the present disclosure.

Figure 3:
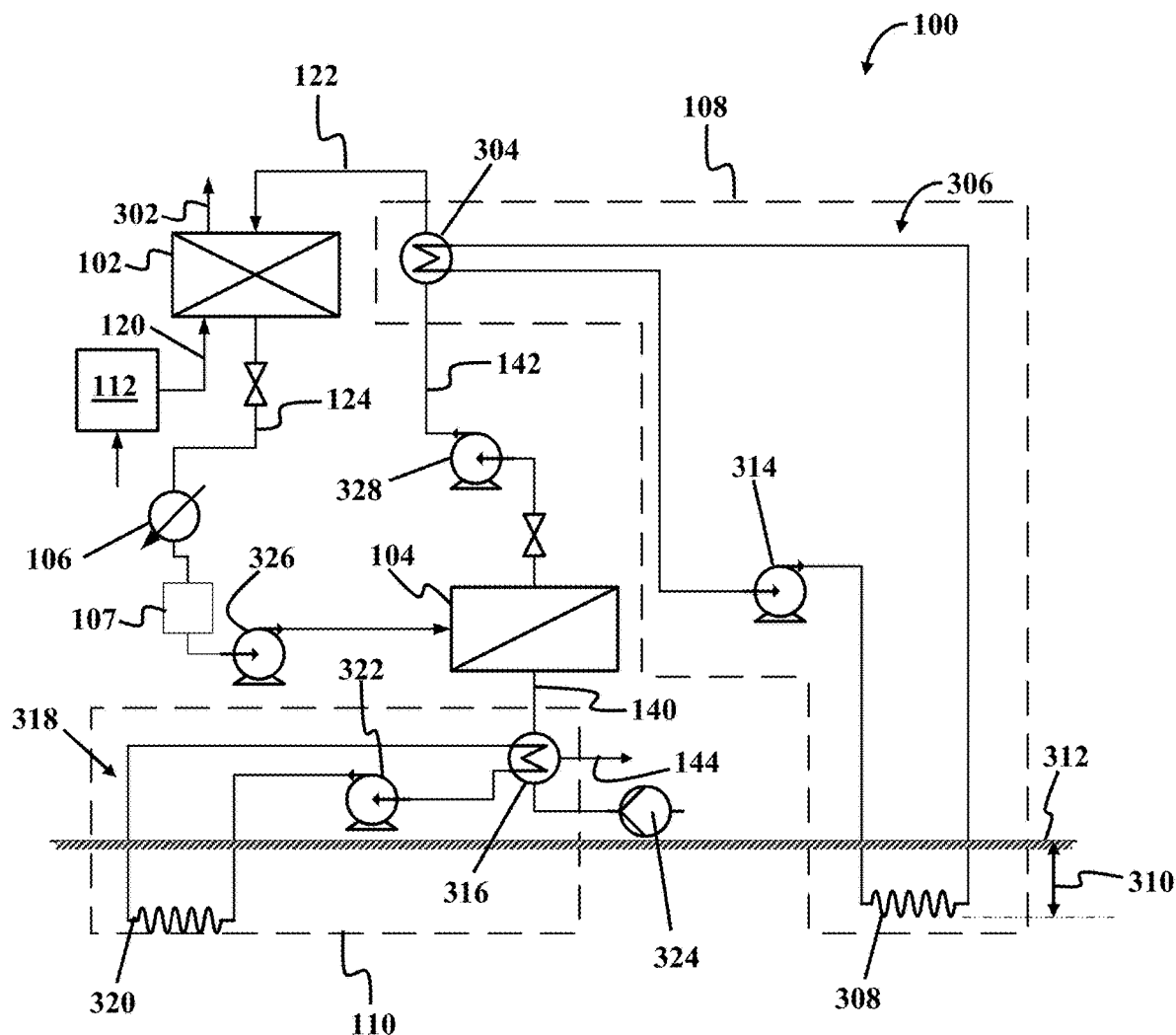
FIG. 3 illustrates a flow diagram of an atmospheric water generating system, consistent with one or more exemplary embodiments of the present disclosure.

FIG. 3 illustrates a flow diagram of atmospheric water generating system 100, consistent with one or more exemplary embodiments of the present disclosure. Referring to FIG. 3, ambient air stream 120 provided by air flow generating mechanism 112 may be fed into water-absorption unit 102 from a first end and water-absorbent liquid stream 122 may be fed into water-absorption unit 102 from a second opposing end in a counter-flow arrangement. Water-absorption unit 102 may absorb moisture content of air flow stream 120 by contacting air flow stream 120 with water-absorbent liquid stream 122 thereby generating a hydrated solution stream 124 and a moisture-free air stream 302.

Figure 4:
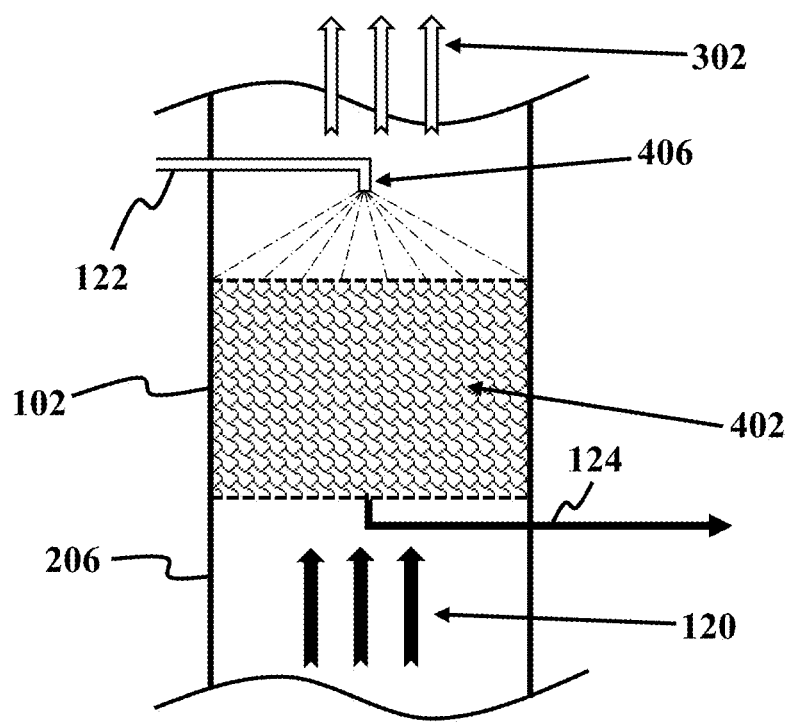
FIG. 4 illustrates a sectional view of a water-absorption unit, consistent with one or more exemplary embodiments of the present disclosure.

FIG. 4 illustrates a sectional view of water-absorption unit 102, consistent with one or more exemplary embodiments of the present disclosure. Referring to FIG. 4A, in an exemplary embodiment, water-absorption unit 102 may be a packed bed absorber disposed within central tower 206. Water-absorption unit 102 may include a bed of a packing material 402, in which the packing material 402 may provide a large contact surface on which ambient air stream 120 and water-absorbent liquid stream 122 may be put in contact with one another. In an exemplary embodiment, water-absorbent liquid stream 122 may be sprayed over the packing material from above utilizing a distributor 404 and ambient air stream 120 may flow upwardly through the packing material 402 which is wetted by the sprayed water-absorbent liquid and thereby the moisture in ambient air stream 120 may be transferred or in other words absorbed into water-absorbent liquid stream 122 and generate hydrated solution stream 124 and moisture-free air stream 302. In an exemplary embodiment, water-absorbent liquid may include glycerol, lithium chloride, calcium chloride, or other similar water-absorbents. As used herein, "moisture-free air" may still contain a small amount of moisture and the term is used to distinguish the ambient air from the air exiting water-absorption unit 102. In an exemplary embodiment, the bed of packing material 238 may be a structured bed or a randomly packed bed.

Referring to FIG. 3, consistent with one or more exemplary embodiments, hydrated solution stream 124 may be pre-heated in heating mechanism 106. In an exemplary embodiment, heating mechanism 106 may be a solar collector that may heat hydrated solution stream 124 employing radiant solar energy.

Figure 5:
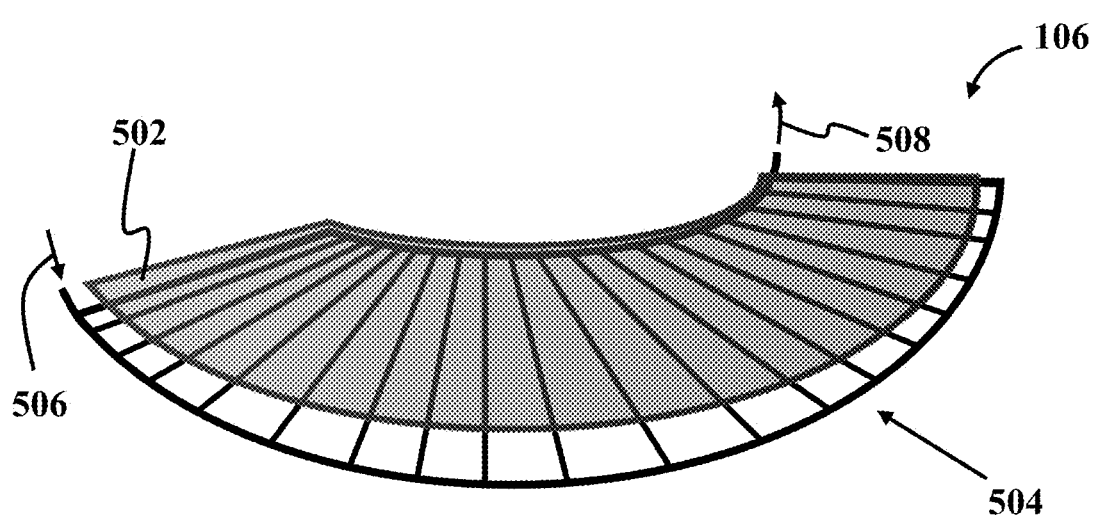
FIG. 5 illustrates a sectional perspective view of a heating mechanism, consistent with one or more exemplary embodiments of the present disclosure.

FIG. 5 illustrates a sectional perspective view of heating mechanism 106, consistent with one or more exemplary embodiments of the present disclosure. Referring to FIGS. 2B-2D and 5, heating mechanism 106 may include an inclined annular perforated dark panel 502 that may be disposed in interior enclosure 218 below annular transparent panel 221. In an exemplary embodiment, heating mechanism 106 may further include a series of interconnected pipes 504 that may be placed under inclined annular perforated dark panel 502. Hydrated solution stream 124 may enter series of interconnected pipes 504 from inlet 506 and flow through interconnected pipes 504 to be pre-heated by the solar energy received via inclined annular perforated dark panel 502. Pre-heated hydrated solution may exit interconnected pipes 504 via outlet 508. In an exemplary embodiment, the hydrated solution may be preheated to a temperature of at least 80° C.

Referring back to FIG. 3, consistent with one or more exemplary embodiments, after hydrated solution stream 124 is pre-heated in heating mechanism 106, pre-heated hydrated solution stream 124 may be pumped into separation unit 104. In an exemplary embodiment, before pumping pre-heated hydrated solution stream 124 into separation unit 104, pre-heated hydrated solution stream 124 may pass through a phase change material (PCM) heat exchanger 107 so that a portion of its energy may be stored in PCM heat exchanger 107. In an exemplary embodiment, the energy stored in PCM heat exchanger 107 may be utilized at nights to preheat hydrated solution stream 124.

Referring to FIG. 3, consistent with one or more exemplary embodiments, separation unit 104 may be a membrane separation unit. Separation unit 104 may include a water-selective membrane that may selectively allow water vapor to permeate through the membrane and thereby may separate the water vapor from water-absorbent liquid. In an exemplary embodiment, separation unit 104 may receive pre-heated hydrated solution stream 124 and may generate a permeate stream including water that exits separation unit 104 via water stream 140 and a retentate stream including water-absorbent liquid that exits separation unit 104 via regenerated water-absorbent liquid stream 142.

Figure 6:
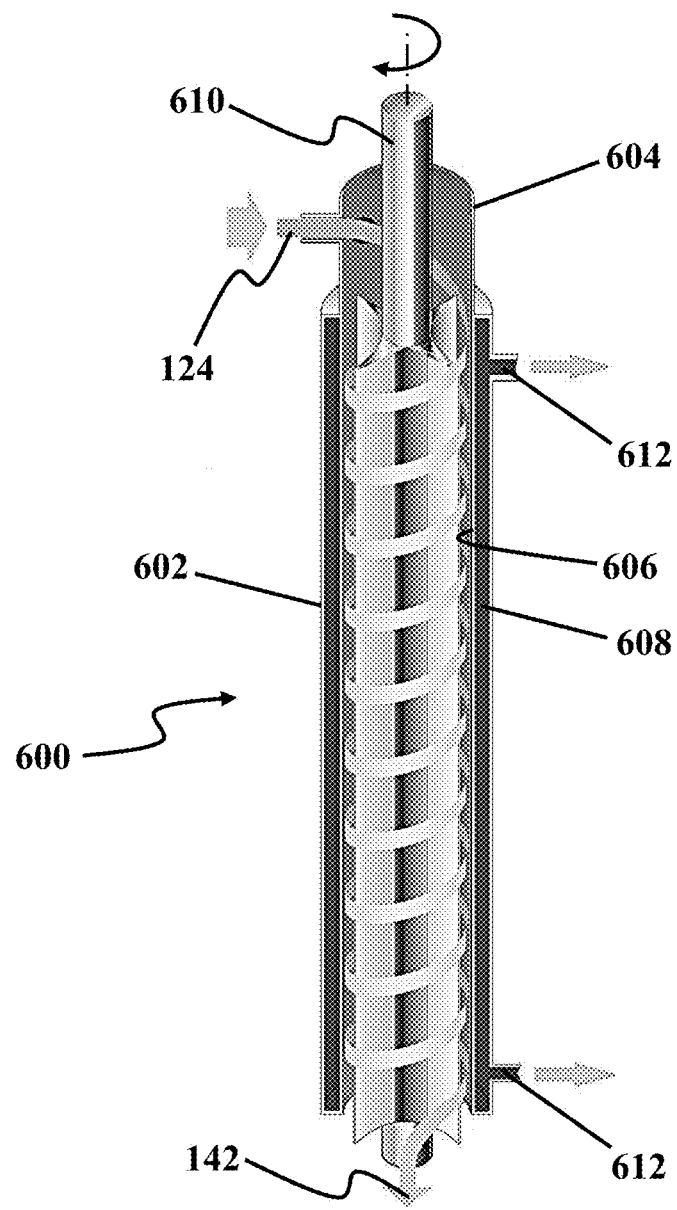
FIG. 6 illustrates a membrane separation unit, consistent with one or more exemplary embodiments of the present disclosure.

FIG. 6 illustrates a membrane separation unit 600, consistent with an exemplary embodiment of the present disclosure. Membrane separation unit 600 may be similar to separation unit 104 of FIG. 3. Referring to FIG. 6, in an exemplary embodiment, membrane separation unit 600 may include a cylindrical enclosure 602 in which a cylindrical water-selective membrane 604 may be disposed. Cylindrical membrane 604 may define an interior chamber 606 and an exterior chamber 608 within cylindrical body 602 such that only water vapor is allowed by water-selective membrane 604 to pass from interior chamber 606 through water-selective membrane 604 into exterior chamber 608. In an exemplary embodiment, membrane separation unit 600 may further include a central rotating screw 610 disposed within interior chamber 606 and rotatable inside interior chamber 606 and thereby guiding pre-heated hydrated solution stream 124 downward within interior chamber 606. Exterior chamber 608 may include two outlet ports 612 in fluid communication with a vacuum source (labeled 324 in FIG. 3) that may provide the required suction to draw the water vapor content of the hydrated solution through water-selective membrane 604 from interior chamber 606 toward exterior chamber 608. Generated water stream may exit membrane separation unit 600 via outlet ports 612 and regenerated water-absorbent stream 142 may exit membrane separation unit 600 via an opening at a bottom portion of interior chamber 606. In an exemplary embodiment, water-selective membrane 604 may be a composite polymer membrane, such as polyether sulfone.

Referring to FIGS. 2A and 2C, consistent with an exemplary embodiment, solar chimney 202 may further include a vacuum ejector 238 that may be disposed within central tower 206 above lower inlet 212. In an exemplary embodiment, vacuum ejector 238 may include an inlet nozzle 240 and a converging diverging nozzle 242 that may be positioned downstream from inlet nozzle 240. Vacuum ejector 238 may further include a suction port 244 that may open into a suction chamber 246 defined between an outlet of inlet nozzle 240 and inlet of converging diverging nozzle 242. As ambient air flows through vacuum ejector 238, a suction is created in suction port 244. With further reference to FIG. 6, consistent with an exemplary embodiment, suction port 244 may be connected to exterior chamber 608 as a vacuum source.

Referring back to FIG. 3, consistent with one or more exemplary embodiments, regenerated water-absorbent stream 142 may be pumped into absorbent cooling mechanism 108 to be cooled before it is fed back to water-absorption unit 102. In an exemplary embodiment, absorbent cooling mechanism 108 may include a heat exchanger 304 in which regenerated water-absorbent stream 142 may be put in contact with a cooling fluid. The cooling fluid stream in heat exchanger 304 may be provided by a first cooling fluid cycle 306 that may include a buried first underground coil 308 at a predetermined depth 310 from ground surface 312 and a first cooling fluid pump 314 that may constantly circulate the cooling fluid in the first cooling fluid cycle 306. The temperature of soil decreases as the depth from the surface of the ground increases and at a predetermined depth it reaches a constant value in both cold weather and hot weather. For example, at a depth of about 10 meters from the surface, the soil temperature may be constant and about 6° C. This cold temperature may be utilized to cool down the cooling fluid as it flows inside first underground coil 308.

Referring to FIG. 3, consistent with one or more exemplary embodiments, generated water stream 140 in separation unit 104 may further be cooled and condensed in condensing mechanism 110. In an exemplary embodiment, condensing mechanism 110 may include a condenser 316 in which generated water stream 140 may be put in contact with a cooling fluid. The cooling fluid stream in condenser 316 may be provided by a second cooling fluid cycle 318 that may be similar to first cooling fluid cycle 306. Second cooling fluid cycle 318 may include a buried second underground coil 320 at a predetermined depth from ground surface and a second cooling fluid pump 322 that constantly circulates the cooling fluid in the second cooling fluid cycle 318.

Referring to FIG. 3, consistent with one or more exemplary embodiments of the present disclosure, all the pumps and moving mechanisms in atmospheric water generating system 100, including first cooling fluid pump 314 and second cooling fluid pump 322, or pumps 326 and 328 that are utilized for pumping the hydrated solution and the regenerated water-absorbent liquid, respectively, may be powered by the electricity generated by wind turbine 232 inside central tower 206. Therefore, all the energy required for atmospheric water generating system 100 may be provided by renewable energy sources.

While the foregoing has described what are considered to be the best mode and/or other examples, it is understood that different modifications may be made therein and that subject matter disclosed herein may be implemented in different forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that different features are grouped together in different implementations. Such grouping is for purposes of streamlining this disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While different implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, different modifications and changes may be made within the scope of the attached claims.

What is claimed is:

1. An atmospheric water generation system, the system comprising:
 a solar collector including:
  a heat absorbing roof including a perforated dark panel; and
  an interior enclosure adjacent the heat absorbing roof, wherein the perforated dark panel is configured to allow ambient air into the interior enclosure;
 a central tower extending upward from the solar collector, the central tower including an upper air outlet opening into atmosphere and a lower air inlet opening to the interior enclosure configured to allow heated air in the interior enclosure to flow from the interior enclosure through the central tower to create an upward air flow stream in the central tower;
 a water-absorption unit disposed within the central tower, the water-absorption unit fluidly connected to the interior enclosure, the water-absorption unit configured to absorb moisture content of the air flow stream by putting in contact the air flow stream with a water-absorbent liquid stream thereby generating a hydrated solution stream and a moisture-free air stream; and
 a membrane separation unit comprising a water-selective membrane, the hydrated solution stream fed to the membrane separation unit, the membrane separation unit configured to generate a permeate stream including water and a retentate stream including water-absorbent liquid.

2. The atmospheric water generation system of claim 1, further comprising:
 a wind-catching mechanism configured to catch and guide winds into the water-absorption unit, the wind-catching mechanism comprising an elevated tower with a plurality of lateral air inlets on an upper periphery of the elevated tower, the plurality of air inlets in fluid communication with the interior enclosure.

3. The atmospheric water generation system of claim 2, wherein the wind-catching mechanism further comprises an air duct buried under ground, the air duct connecting the plurality of lateral air inlets to the interior enclosure.

4. The atmospheric water generation system of claim 3, wherein the air duct connecting the plurality of lateral air inlets to the interior enclosure comprising a converging nozzle.

5. The atmospheric water generation system of claim 1, further comprising a vacuum ejector disposed within the central tower above the lower inlet, the vacuum ejector comprising:
 an inlet nozzle;
 a diverging nozzle positioned downstream from the inlet nozzle; and
 a suction port opening into the vacuum ejector downstream from the inlet nozzle and upstream from the diverging nozzle,
 wherein the vacuum ejector is configured to create suction in the suction port responsive to the ambient air flowing through the vacuum ejector.

6. The atmospheric water generation system of claim 5, wherein the membrane separation unit comprises:
 a main enclosure; and
 a water-selective membrane disposed within the main enclosure, the water-selective membrane defining an interior chamber and an exterior chamber within the main enclosure, the interior chamber configured to allow the hydrated solution stream to be bed to it, the exterior chamber connected to and in fluid communication with the suction port.

7. The atmospheric water generation system of claim 1, further comprising:
 a heating mechanism configured to preheat the hydrated solution stream, the heating mechanism comprising a series of interconnected pipes disposed within the interior enclosure adjacent the heat absorbing roof, the interconnected pipes in fluid communication with the water-absorption unit configured to receive the hydrated solution stream, the interconnected pipes further in fluid communication with the membrane separation unit configured to feed the preheated hydrated solution stream to the membrane separation unit.

8. The atmospheric water generation system of claim 1, further comprising:
 a condenser configured to condense the permeate stream by putting in contact the permeate stream with a cooling fluid flowing in a first cooling cycle, the first cooling circuit comprising a first cooling coil buried in soil at a first predetermined depth.

9. The atmospheric water generation system of claim 8, wherein the predetermined depth is at least 10 m.

10. The atmospheric water generation system of claim 1, further comprising:
 a cooling mechanism configured to cool the retentate stream by putting in contact the retentate stream with a cooling fluid flowing in a second cooling circuit, the second cooling circuit comprising a second cooling coil buried in soil at a second predetermined depth.

11. The atmospheric water generation system of claim 1, wherein the heat absorbing roof further comprises a transparent panel attached to the perforated dark panel.

12. The atmospheric water generation system of claim 11, further comprising:
 a heating mechanism configured to preheat the hydrated solution stream, the heating mechanism comprising:
 an inclined perforated dark panel disposed within the interior enclosure below the transparent panel; and
 a series of interconnected pipes disposed within the interior enclosure under the inclined perforated dark panel, the interconnected pipes in fluid communication with the water-absorption unit configured to receive the hydrated solution stream, the interconnected pipes further in fluid communication with the membrane separation unit configured to feed the preheated hydrated solution stream to the membrane separation unit.

13. The atmospheric water generation system of claim 12, wherein the hydrated solution stream is preheated to a temperature of at least 80° C.

14. The atmospheric water generation system of claim 1, wherein the water-absorption unit comprises:
 a packed bed absorber including a bed of a packing material, the water-absorbent liquid stream sprayed over the packing material, the air flow stream flowing upwardly through the packing material.

15. The atmospheric water generation system of claim 1, wherein the membrane separation unit comprises:
- a main enclosure; and
- a water-selective membrane disposed within the main enclosure, the water-selective membrane defining an interior chamber and an exterior chamber within the main enclosure, the hydrated solution stream fed to the interior chamber, the exterior chamber connected to a vacuum source.

16. The atmospheric water generation system of claim 15, wherein the water-selective membrane is a composite polymer membrane including polyether sulfone.

* * * * *